United States Patent [19]

Suzuki

[11] Patent Number: 5,019,858
[45] Date of Patent: May 28, 1991

[54] PHOTOGRAPHIC PRINTER

[75] Inventor: Kenji Suzuki, Kanagawa, Japan

[73] Assignee: Fuji Photo Film Co., Ltd., Kanagawa, Japan

[21] Appl. No.: 486,674

[22] Filed: Feb. 28, 1990

[30] Foreign Application Priority Data

Mar. 1, 1989 [JP] Japan .................................. 1-49659

[51] Int. Cl.⁵ .............................................. G03B 27/80
[52] U.S. Cl. ........................................ 355/35; 355/38; 355/77
[58] Field of Search ........................ 355/68, 77, 38, 35

[56] References Cited

U.S. PATENT DOCUMENTS

4,866,475 9/1989 Suzuki .................................. 355/38
4,933,709 6/1990 Manico et al. ........................ 355/38

Primary Examiner—L. T. Hix
Assistant Examiner—D. Rutledge
Attorney, Agent, or Firm—Sughrue, Mion, Zinn, Macpeak & Seas

[57] ABSTRACT

A photographic printer has a scanner for calculating a scanner correction quantity by deriving a plurality of characteristic values and a simulator for displaying, on a monitor, an image that is the same as a finished photographic print. While observing the simulated image on the monitor at the time of inspecting an original image, if it is determined that a finished print would become improper, a manual correction quantity is entered upon operation of a correction key. After inspecting the original image, the manual correction quantity as a target value and characteristic values are stored in a memory. Every time one original image has been inspected, or after a predetermined number of original images have been inspected, a plurality of such stored values are read from the memory to form an algorithm for obtaining the scanner correction quantity. For a subsequent original, this new algorithm is used for calculating the scanner correction quantity.

20 Claims, 6 Drawing Sheets

PHOTOGRAPHIC PRINTER

BACKGROUND OF THE INVENTION

The present invention relates to a photographic printer having a scanner and a simulator, and more particularly to a photographic printer which is able to learn a scanner correction quantity.

In a photographic printer, exposure quantity is controlled in accordance with a large area transmittance density (LATD) of an original image to be printed. This LATD exposure control method presents a problem in that a subject failure occurs if an original image deviates in density or color. There is a known photographic printer wherein, in order to control exposure precisely so as to avoid such a subject failure, each point of an original image is measured with an image sensor to obtain average transmittance densities of the original image at image areas such as the upper half, the lower half, the central area and the like by using the measured light values. These obtained characteristic values are used in calculating the scanner correction quantity to correct the exposure quantity obtained by LATD.

There also is a known photographic printer having a simulator which displays an image simulating a finished photographic print on a monitor by picking up an original image with an image pickup device in order to avoid improper prints. With this photographic printer having a simulator, the color balance and density of the simulated image are adjusted in accordance with an exposure quantity. If it is judged that a finished print would become improper, a correction key is operated to enter a manual correction quantity to change the density or color balance of a simulated image on the monitor.

There also is a known photographic printer having a simulator and scanner which displays a simulated image on the monitor while considering a scanner correction quantity. The scanner is used for alleviating the burden on an operator by reducing the number of original images to be subjected to manual correction with a correction key. A calculation equation is determined to obtain a scanner correction quantity experimentally. In performing the experiments, a number of original images are used to check the adaptability of the scanner correction quantity calculation equation. However, since there are limited numbers and types of original images to be used for the experiments, it is difficult to determine an optimum scanner correction quantity calculation equation.

Further, the type of original images for which prints are to be requested may change with the seasons; for example, there are many scenes including snow in winter, and many scenes including sea in summer. A conventional scanner cannot obtain a scanner correction quantity suitable for each particular season. Furthermore, each laboratory will have its own preference as to the state of a finished print, so that it would be desirable to use a particular scanner correction quantity calculation equation suitable for each laboratory.

SUMMARY OF THE INVENTION

In view of the foregoing, it is a principal object of the present invention to provide a photographic printer capable of modifying a scanner correction quantity calculation equation into an optimum one by learning new data every time an original image has been inspected.

It is another object of the invention to provide a photographic printer capable of obtaining a scanner correction quantity calculation equation which is fit for each laboratory and can take into consideration the characteristics of scenes during different seasons.

In order to achieve the foregoing and other objects and advantages of the present invention, an algorithm is formed which obtains a scanner correction quantity by using data stored in a memory, that data including characteristic values and a manual correction quantity target value determined by observing a simulated image so as to obtain a finished photographic print of good quality.

The algorithm may be formed every time a single original image has been inspected, or after a predetermined number of original images have been inspected. In this case, a scanner correction quantity calculation equation itself may be formed directly. Alternatively only the coefficients of a predetermined scanner correction quantity calculation equation may be changed by using regression analysis (a least square method) Further, a scanner correction quantity may be obtained by using a scanner at the time of inspecting an original image to simulate the original image while considering the obtained scanner correction quantity. In this case, the value of the scanner correction quantity added to the manual correction quantity is used as a target value.

According to the present invention, every time an original image has been inspected, a measure to counter the factors of characteristic values is learned as a target value and a scanner correction quantity calculation equation is formed or modified in accordance with a plurality of obtained data. Accordingly the scanner correction quantity calculation equation can be made precise so as to allow the calculation of a scanner correction quantity near the target value.

BRIEF DESCRIPTION OF THE DRAWINGS

The foregoing and other objects and advantages of the invention will become apparent from the following detailed description with reference to the accompanying drawings in which.

DETAILED DESCRIPTION OF THE PREFERRED EMBODIMENTS

Figure 1:
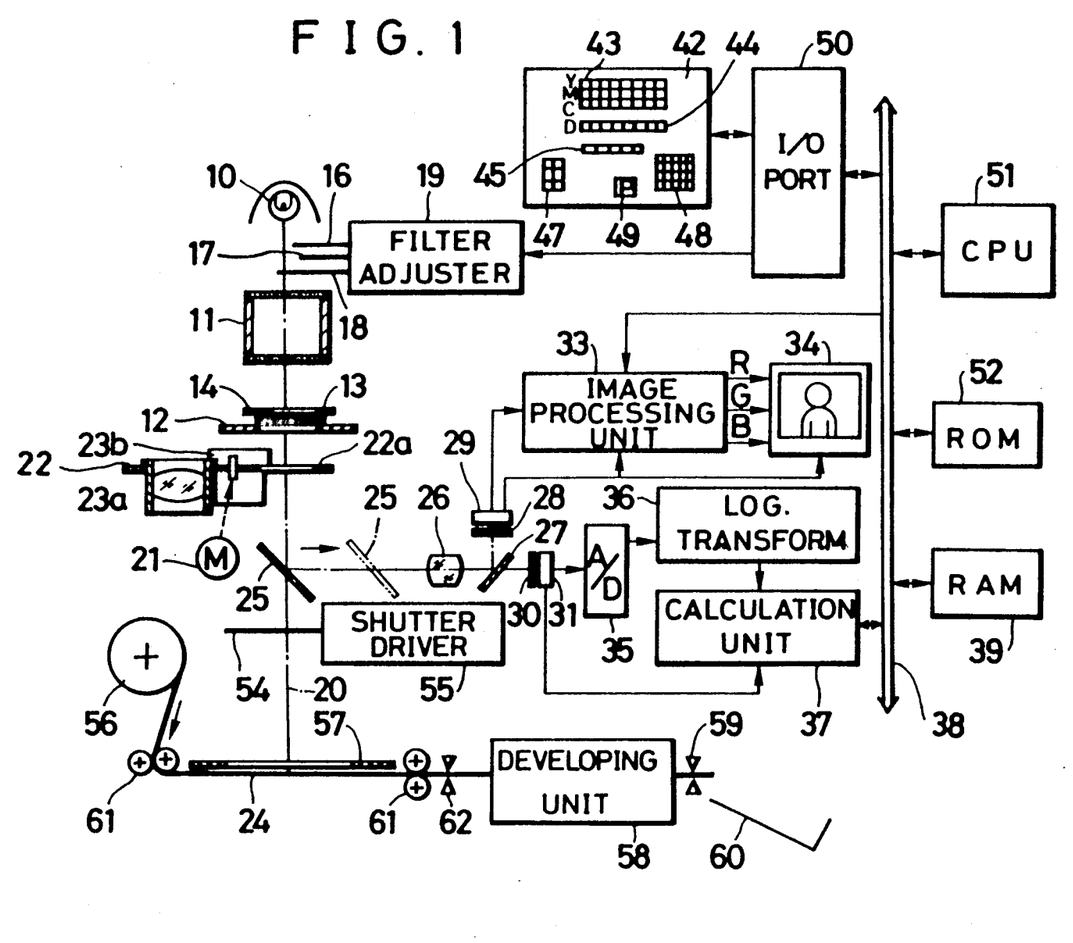
FIG. 1 is a schematic diagram showing an embodiment of a photographic printer according to the invention.

Referring to FIG. 1, white light radiated from a light source 10, diffused by a mixing box 11 illuminates an original image such as a color negative film 13 set at a film carrier 12. A cyan filter 16 for adjustment of red color components of the light, a magenta filter 17 for adjustment of green color components and a yellow filter 18 for adjustment of blue color components are disposed between the mixing box 11 and the light source 10. A filter adjuster 19 has three pulse motors for driving the color filters 16 to 18. The degree of insertion of the color filters 16 to 18 into a printing optical path 20 is adjusted in accordance with the exposure quantity of each color.

Below the color negative film 13, a motor 21 rotates a turret 22 having a plurality of print lenses, for example two print lenses 23a and 23b as shown. One of these lenses is selected in accordance with a magnification factor determined by the frame size of the color negative film 13 or a color paper 24, and is set in the printing optical path 20. The turret 22 is formed with an opening 22a for image pickup and photometry, the opening 22a being set in the printing optical path 20 during a monitoring mode.

A light passed through the turret 22 is reflected laterally by a mirror 25 to be incident on a zoom lens 26. The mirror 25 is retracted from the printing optical path 20 during a print mode. The focal length of the zoom lens is adjusted in accordance with the frame size of the color negative film 13 so as to provide the same size of simulated image on a monitor for different sizes of color negative films. At the back of the zoom lens 26 there is disposed a half mirror 27 for dividing an optical path into two parts. Light reflected by the half mirror 27 is incident on an image pickup sensor unit 29 via a color filter 28 which is formed with red, green and blue color areas at a predetermined pitch. Light transmitted through the half mirror 27 is incident on a photometry sensor unit 31 via a color filter 30.

A video signal outputted from the image pickup sensor unit 29 is sent to an image processing unit 33 to simulate the image of the color paper 24. The video signals outputted from the image processing unit 33 are sent to a color monitor 34 to display a simulated image of the photographic print to be made. A synchro signal outputted from the image pickup sensor unit 29 is sent to the image processing unit 33 and the color monitor 34.

Figure 4:
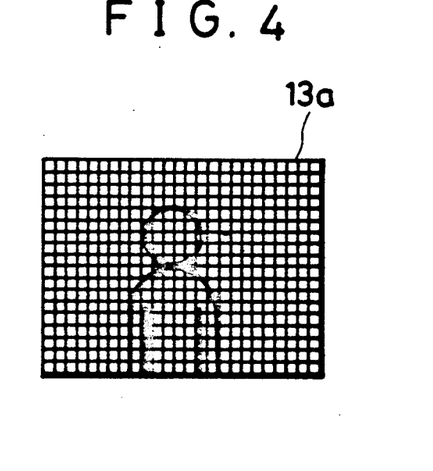
FIG. 4 illustrates the state of divisional photometry by the scanner.

The photometry sensor unit 31 measures the three separated colors at each area of a plurality of divisional areas of an image frame 13a (FIG. 4). In this embodiment, there are 14 vertical divisions and 18 horizontal divisions to enable three color separation photometry at 252 measuring points, thereby obtaining 756 spots as data. The photometry image sensor unit 31 reads red, green and blue color signals at each measuring point and sends them as a time sequential signal via an analog-to-digital (A/D) converter 35 to a logarithmic transformer 36 in which the time sequential signal is converted logarithmically into a density signal (strictly speaking, a logarithmic conversion value proportional to a transmittance density). This density signal is sent to a calculation unit 37 including a microcomputer to calculate an LATD and a scanner density correction quantity. The above circuits together constitute a scanner.

The LATD data and scanner density correction quantity data which the scanner obtains are sent via a bus line 38 to a random access memory (RAM) 39 and are written therein. After this write operation, the data is picked up by a central processing unit (CPU) 51 and are substituted into the exposure quantity calculation equation to calculate the red, green and blue exposure quantities. In order to speed up the exposure quantity calculation, three photometry sensor units for measuring each color LATD may be provided in addition.

A keyboard 42 has mounted thereon color correction keys 43 for entering a manual color correction quantity for the photographic printing system, density correction keys 44 for entering a manual density correction quantity for the photographic printing system, function keys 45 for entering at the same time both the manual density correction quantity and manual color correction quantity for a particular scene, operation keys 47 for designating an operation, data input keys 48 for entering channel data or the like such as paper type negative film type, print size or the like, and a print key 49. Commands or data entered from the keyboard 42 are sent via an input/output (I/O) port 50 to CPU 51. A read only memory (ROM) 52 stores a simulation procedure program, a photographic printing procedure program, and the like.

A shutter 54 is driven by a shutter driver 55 when a print is to be made, opening the printing optical path 20 for a predetermined time to expose the color paper 24. After printing one frame of the color paper 24, an unexposed portion thereof is pulled out from a supply reel 56 and is set at an exposure stage at the back of a paper mask 57. The exposed portion is sent to a known developing unit 58 to be developed, and thereafter it is cut as one frame with a cutter 59 and is ejected onto a tray 60. A roller pair 61 nips and feeds the color paper 24, and a cutter 62 cuts off the exposed color paper at its back end.

Figure 2:
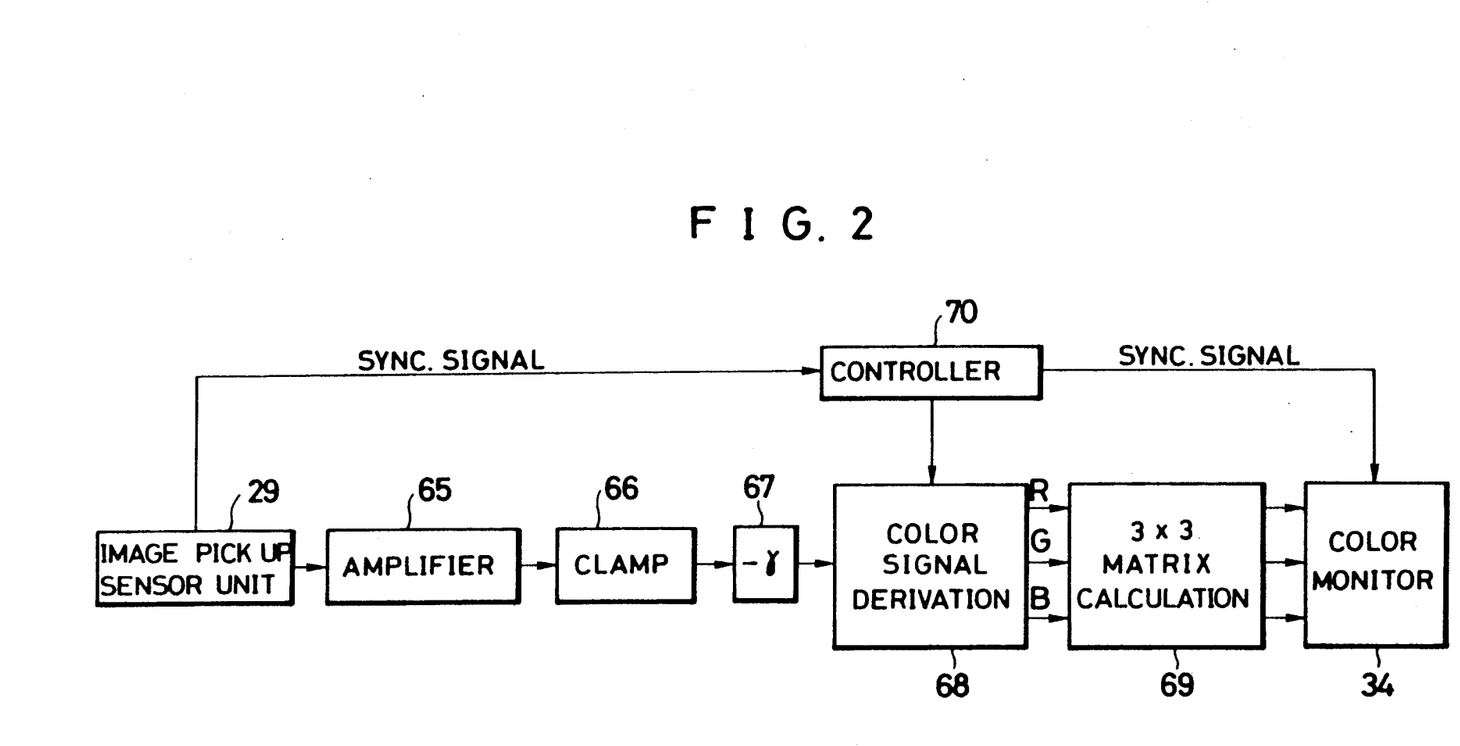
FIG. 2 is a block diagram showing an example of a simulator.

FIG. 2 shows an example of a simulator. A video signal outputted from the image pickup sensor unit 29 is amplified by an amplifier 65 and is sent to a clamp circuit 66 to be set at a reference potential. The video signal outputted from the clamp circuit 66 is sent to a gamma circuit 67 for gamma correction and negative/positive reversal. The gamma corrected video signal is sent to a color signal derivation circuit 68, from which red, green and blue color signals are derived. These color signals are sent to a $3 \times 3$ matrix calculation circuit 69 to perform an electric masking process and thus correct a difference in coloring characteristic between the color monitor 34 and color paper 24. Thereafter the signals are sent to the color monitor 34. A controller 70 controls the circuits in synchronism with the synchro signal from the image pickup sensor unit 29. If the type of a color paper is to be changed, a corresponding paper channel is designated so that CPU 51 changes the coefficients for matrix calculation so as to match a new color paper. In this embodiment, a color CRT is used as the color monitor. Instead, a color liquid crystal panel or the like may be used.

Figure 3:
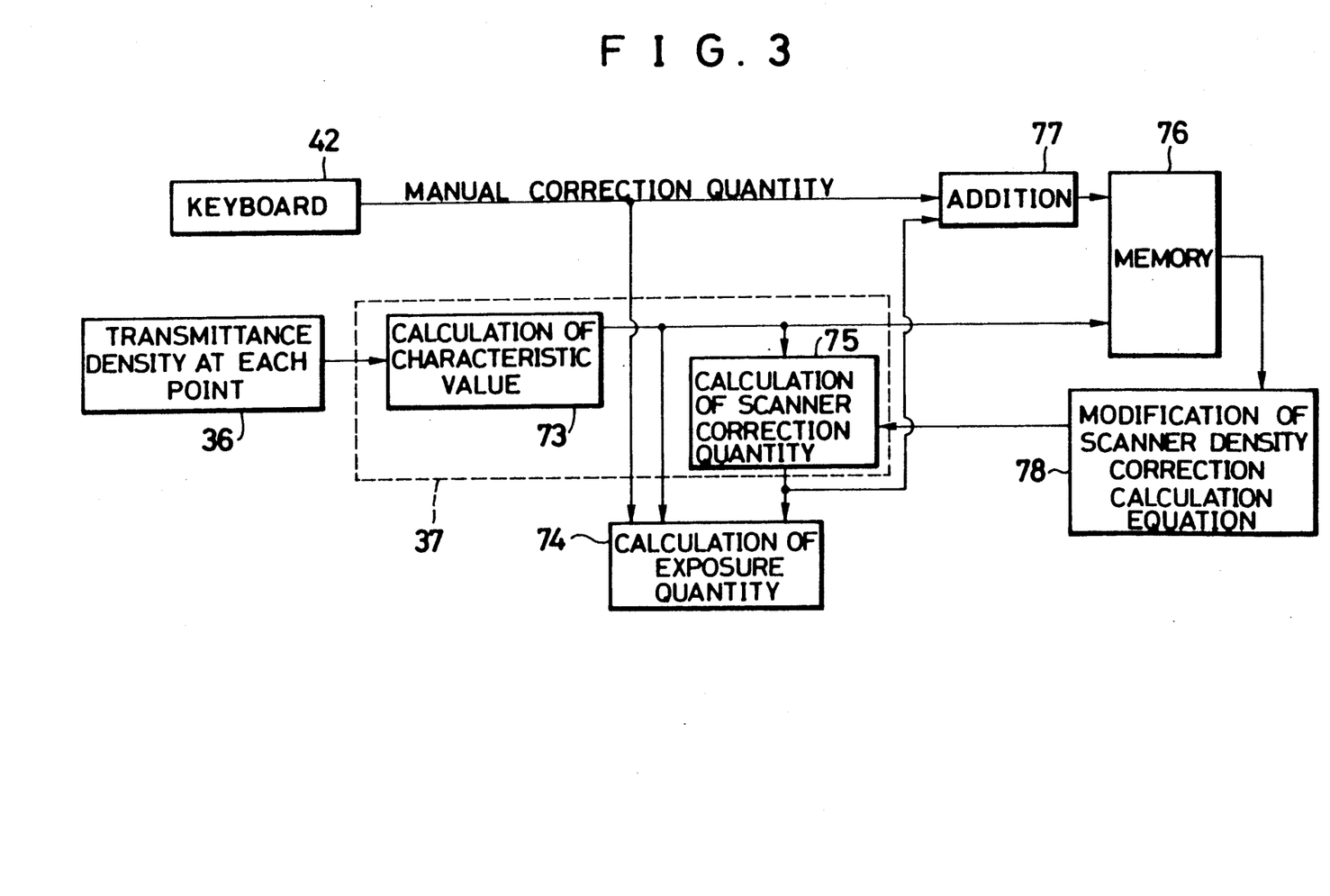
FIG. 3 is a block diagram showing a part of the function performed by the calculation unit and CPU shown in FIG. 1.

FIG. 3 is a block diagram showing the function of the calculation unit and CPU. 252 measured data for each color are converted into densities at the logarithmic transformer 36 and are sent to the calculation unit 37. An arithmetic operation unit 73 of the calculation unit 37 calculates characteristic values such as LATD, average transmittance densities at particular areas (e.g. upper half, lower half, central area and the like of the image frame), maximum transmittance density, and the like. The LATD is sent to an exposure quantity calculation unit 74, and the average transmittance densities at particular areas and the maximum transmittance density are sent to an arithmetic operation unit 75 and memory 76. The arithmetic operation unit 75 calculates a scanner density correction quantity represented by the number of steps of the density correction keys 44 by using a scanner density correction quantity calculation equation.

A manual density correction quantity entered via one of the density correction keys 44 and represented by the number of steps of the density correction keys 44, is sent to the exposure quantity calculation unit 74 and adder 77. The adder 77 adds together the manual density correction quantity and scanner density correction quantity to calculate a target value represented by the number of key steps. This target value is used to correct the exposure amount determined by the LATD so as to optimize a scanner density correction quantity calculation equation which can calculate this target value. The target value outputted from the adder 77 is sent to the memory 76 and is stored, together with the characteristic values used for the scanner density correction quantity calculation equation.

Every time one frame has been inspected a calculation unit 78 modifies the scanner density correction quantity calculation equation by using data stored in the memory 76, the modified scanner density correction quantity calculation equation being written in the arithmetic operation unit 75. This new scanner density correction quantity calculation equation is used for the next frame. As described above, since new data are learned every time one frame has been inspected the scanner density correction quantity calculation equation is modified gradually to provide an equation which rarely requires manual correction.

Modifying the scanner density correction quantity calculation equation now will be described. $X_j$ (j=1, 2, 3, ...) represents a characteristic value, $C_k$ (k=1, 2, 3, ...) represents a coefficient, and Y represents a target value for a linear equation as a scanner correction density quantity calculation equation. If j=4 and k=5, the linear equation is:

$$Y = C_1 X_1 + C_2 X_2 + C_3 X_3 + C_4 X_4 + C_5 \quad (1)$$

Figure 6:
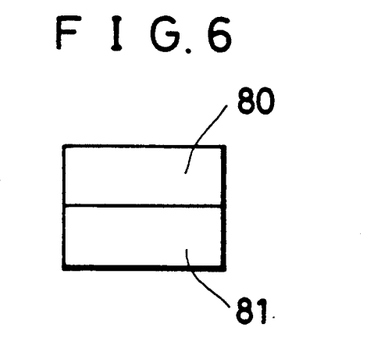
FIGS. 6 and 7 illustrate areas from which characteristic values are derived.
Figure 7:
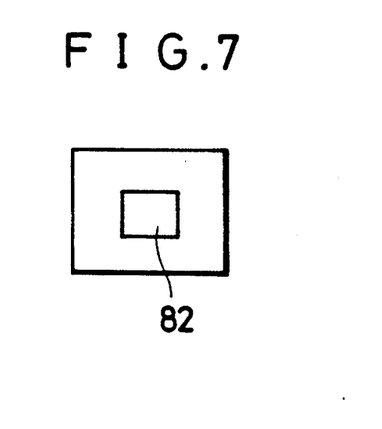

The average transmittance density at each area shown in FIGS. 6 and 7 or other values are used as the characteristic value $X_j$.

$X_1$ = average transmittance density at the upper half 80 of the image frame, $X_2$ = average transmittance density at the lower half 81 of the image frame, $X_3$ = average transmittance density at the central area 82 of the image frame, $X_4$ = maximum transmittance density within the image frame.

In order for the scanner density correction quantities for most frames to approach the target value, a number of stored data are used to determine optimum coefficients $C_k$ using a known least squares regression method. By determining new coefficients $C_k$, the scanner density correction quantity calculation equation can be modified.

The exposure calculation unit 74 calculates each exposure quantity $E_i$ (i represents one of red, green, and blue) using the following equation:

$$\log E_i = LM_i \times CS_i \times (D_i - DN_i) + \alpha 1 \times KD + \alpha 2 \times KA + \alpha 3 \times KC_i + \beta_i \quad (2)$$

wherein

LM = a magnification factor slope value prepared for each type of negative film, the value being determined previously in accordance with an enlargement factor determined by the frame size of a negative film and the print size, CS = a slope value prepared for each type of negative film, the value being either an over value, used when the LATD of a frame to be printed is larger than a reference value, or an under value, used when the LATD is smaller than the reference value, DN = LATD for a normal control negative film, D = LATD for a print frame, $\alpha 1$ = a manual correction quantity represented by the number of steps of the density correction keys, KD = an exposure change quantity per step of the density correction keys, $\alpha 2$ = a scanner density correction quantity represented by the number of steps of the density correction keys, KA = an exposure change quantity per step of the density correction keys, $\alpha 3$ = a manual color correction quantity represented by the number of steps of the color correction keys, KC = an exposure change quantity per step of the color correction keys, $\beta$ = a constant determined by the type of negative film and color paper.

Figure 5:
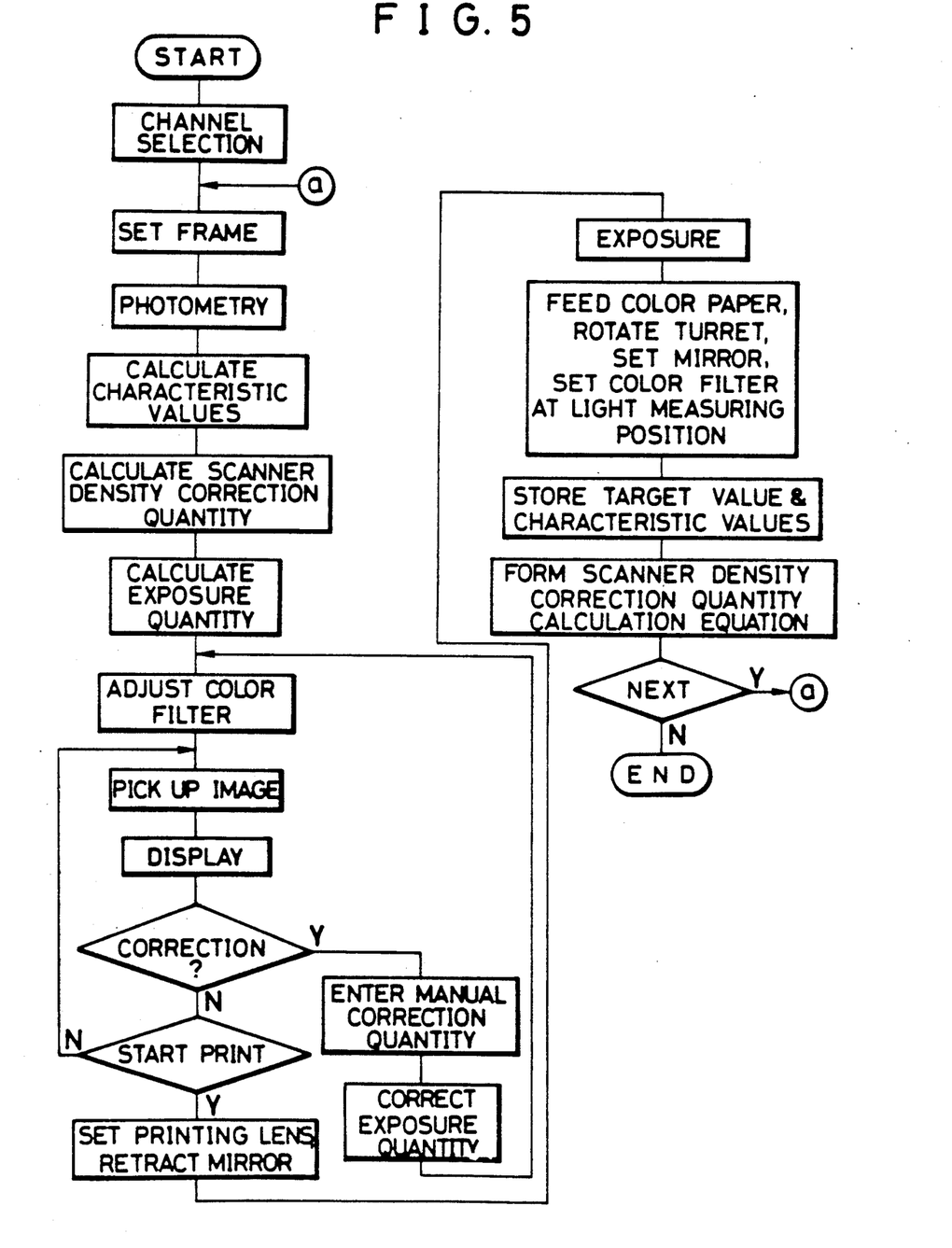
FIG. 5 is a flow chart showing a print procedure.

Next, the operation of the above-described embodiment will be described with reference to FIG. 5. First, the keyboard 42 is operated to select a paper channel, negative film channel, and print size channel, and then a color negative film 13 is set at the film carrier 12. At the start of monitoring, the color filters 16 to 18 are set at the light measuring stage and the opening 22a of the turret 22 and the mirror 25 are set in the printing optical path 20. In addition, the focal length of the zoom lens 26 has been set automatically in accordance with the frame size of the color negative film 13.

The photometry image sensor unit 31 measures each point of the image frame to be printed by three color separation photometry, and the measured data are sent to the calculation unit 37 which then obtains an LATD $D_i$, an average transmittance density $X_1$ at the frame upper half 80, an average transmittance density $X_2$ at the frame lower half 81 an average transmittance density $X_3$ at the frame central area 82, and a maximum transmittance density $X_4$. The arithmetic operation unit 75 of the calculation unit 37 calculates the scanner density correction quantity $\alpha 2$ by using the scanner density correction quantity calculation equation (1). This scanner density correction quantity $\alpha 2$ and the LATD $D_i$ are sent to CPU 51.

The calculation unit 74 of CPU 51 executes the exposure quantity calculation equation (2) by using the coefficients and constants read from RAM 39 upon channel selection, scanner density correction quantity $\alpha 2$, and LATD $D_i$, to calculate the exposure quantity $E_i$ for each color. Since the logarithmic value of the exposure quantity represents a density CPU 51 refers to a color filter calibration curve indicating the relationship between each color filter set position and the density, and determines the set positions of the color filters 16 to 18, respectively, yellow filter 16 for blue, magenta filter 17 for green, and cyan filter 18 for red. The number of drive pulses for a difference between the current positions (light measuring positions) of the color filters 16 to 18 and the set positions thereof then is calculated. The calculated number of drive pulses are sent to the filter adjuster 19 to drive the pulse motors to move the color filters 16 to 18 and to adjust the three color components of the printing light.

Since the simulator simulates the coloring characteristic of the color paper, upon illumination of the image frame via the color filters 16 to 18 under the same conditions as printing the same image as the finished photographic print of the frame is displayed on the color monitor 34 An operator observing the color monitor 34 judges whether the photographic print will be suitable. If the operator determines that there is improper density, the operator will operate one of the density correction keys 44 of the photographic printing system to enter the manual density correction quantity $\alpha 1$ so that the calculation unit 74 increases or decreases the exposure quantity in accordance with the manual density correction quantity $\alpha 1$. Similarly if the operator determines that there is improper color balance, the operator actuates one of the color correction keys 43 to enter the manual color correction quantity $\alpha 3$ to increase or decrease the exposure quantity In accordance with the corrected exposure quantity, the set positions of the color filters 16 to 18 are adjusted to change the illumination state of the frame. The density or color balance of the simulated image on the color monitor 34 is corrected accordingly. At the same time the function keys 45 carry out density correction and color correction so that if one of these keys is actuated the exposure quantity also is increased or decreased.

If the operator judges that the photographic print will be suitable the operator actuates the print key 49 on the keyboard 42. Upon actuation of the print key 49 the turret 22 is rotated to select one of the printing lenses 23a and 23b in accordance with the enlargement factor. The selected lens is set in the printing optical path 20, and the mirror 25 is retracted therefrom. Immediately thereafter, the shutter 54 is operated so that the image frame of the color negative film 13 is printed on the color paper 24 by the printing light whose light quality has been adjusted by the color filters 16 to 18.

After one frame has been printed, the color paper 24 is fed by one frame to set an unexposed portion of the paper at the exposure stage. At the same time the opening 22a of the turret 22 and the mirror 25 are set in the printing optical path 20 and the color filters 16 to 18 are set at the light measuring stage. In addition, the adder 77 adds together the manual density correction quantity $\alpha 1$ and scanner density correction quantity $\alpha 2$ to obtain the target value. This target value and the characteristic values ($X_1$, $X_2$, $X_3$, and $X_4$) are written in the memory 76 which is part of the RAM 39 and are stored therein as new data. After writing the data a number of data stored in the memory 76 are read by the calculation unit 78 to determine the coefficients ($C_1$, $C_2$, $C_3$, and $C_4$) of the scanner density correction quantity calculation equation (2) using the least squares method. The scanner density correction quantity calculation equation (1). modified by using the new coefficients, is written in the calculation unit 74.

If a next frame is to be printed, this frame is set at the print stage in the manner described previously. For this frame, the scanner density correction quantity $\alpha 2$ is calculated by using the latest scanner density correction quantity calculation equation. Again, the characteristic values and target value of this frame are written in the memory 76, and the scanner correction quantity calculation equation again is modified by using this new data.

In the above embodiment, the scanner density correction quantity calculation equation has been modified every time one frame has been inspected. However, the modification may be carried out when data of a predetermined number of frames (e.g., several hundreds to several tens of thousands) are collected. Further, since the memory 76 has a limited capacity it is preferable to erase the oldest data when new data are added. Furthermore, the scanner can calculate a scanner color correction coefficient by which the density difference is multiplied. This invention is applicable to the calculation equation for obtaining such a coefficient.

The scanner density correction quantity calculation equation has used a linear equation in the above embodiment. However a nonlinear equation, such as a quadratic equation or the like may be used. Further, instead of modifying the coefficients, the scanner correction quantity calculation equation itself may be formed. Furthermore, without using the scanner correction quantity for the learning purpose, the exposure quantity may be calculated by using only an LATD to simulate the image at this calculated exposure quantity.

Figure 8:
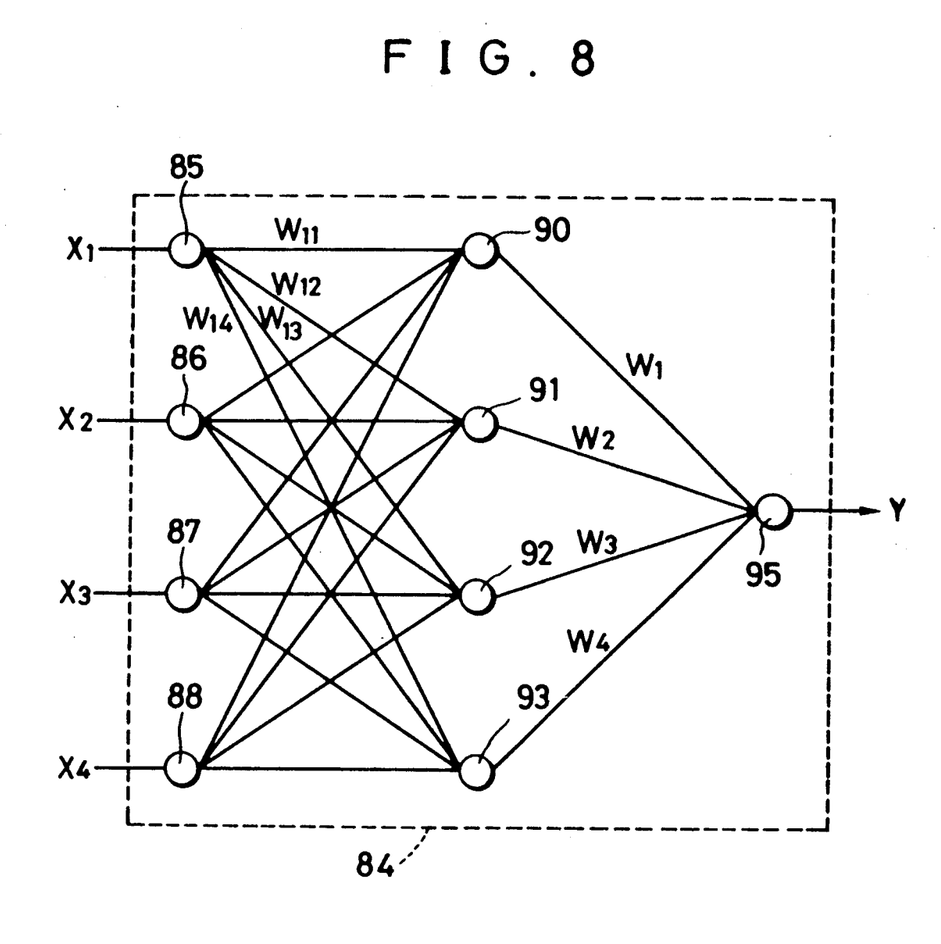
FIG. 8 is a schematic of a neural network used in the invention.

Instead of the self-learning method based on a least squares regression analysis, in the abovedescribed embodiment, a learning method on the basis of a neural network may be utilized in the invention. FIG. 8 schematically shows a neural network 84. The characteristic values $X_1$ to $X_4$ described above are inputted respectively to inputting cells 85 to 88. The characteristic value $X_1$ inputted into the inputting cell 85 is weighted by a weighting coefficient $W_{11}$ and is sent to an intermediate cell 90. Similarly, the characteristic values $X_2$ to $X_4$ are weighted by their respective weighting coefficients $W_{12}$ to $W_{14}$, and the weighted results are sent respectively to intermediate cells 91 to 93. The other cells 86 to 88 multiply the other characteristic values by other weighting coefficients, but are similar to the cell 85. Each of the cells 90 to 93 adds four data inputted from the cells 85 to 88. The data added in each of the cells 90 to 93 are weighted by weighting coefficients $W_1$ to $W_4$ and are sent to an outputting cell 95 in which the data are added. The target value Y can be read out from the outputting cell 95 as a result of the addition.

The present embodiment shown in FIG. 8 has four inputting cells, but the number of inputting cells and intermediate cells may increase in accordance with the increased number of the characteristic values. If one of the weighted coefficients is zero, it means that there is no association between the corresponding two cells.

Although the invention has been described by way of preferred embodiments thereof, various modifications within the spirit of the invention will be apparent to those of working skill in this technological field. Thus, unless otherwise noted, such modifications should be construed as included within the scope of the invention as defined by the appended claims.

What is claimed is:

1. A photographic printer having a scanner for measuring light at each point of an original image and obtaining characteristic values based on the measured light values, and a simulator for displaying a simulated image of a finished photographic print, said printer further comprising:

means for inputting, as a target value, a manual correction quantity determined so as to obtain a proper finished photographic print while observing said simulated image;

a memory for storing a plurality of target values and said characteristic values; and means for forming a new algorithm for obtaining a correction quantity of said scanner by using said plurality of target values and characteristic values from said memory.

2. A photographic printer according to claim 1, wherein said algorithm forming means comprises means for performing regression analysis so as to obtain the coefficients of a calculation equation for obtaining said scanner correction quantity.

3. A photographic printer according to claim 1, wherein said algorithm forming means comprises a neural network for determining a condition of associating cells and weighted amounts of each of said cells.

4. A photographic printer according to claim 2, wherein said algorithm forming means comprises means for obtaining said scanner correction quantity calculation equation.

5. A photographic printer according to claim 2, wherein while a print image is simulated by using said scanner, said target value uses a value of said scanner correction quantity added to said manual correction quantity.

6. A photographic printer according to claim 5, wherein said algorithm forming means forms said algorithm every time one original image has been inspected.

7. A photographic printer according to claim 5, wherein said algorithm forming means forms said algorithm when a predetermined number of original images have been inspected.

8. A photographic printer according to claim 3, wherein while a print image is simulated by using said scanner, said target value uses a value of said scanner correction quantity added to said manual correction quantity.

9. A photographic printer according to claim 8, wherein said algorithm forming means forms said algorithm every time one original image has been inspected.

10. A photographic printer according to claim 8, wherein said algorithm forming means forms said algorithm when a predetermined number of original images have been inspected.

11. A photographic printer according to claim 4, wherein while a print image is simulated by using said scanner, said target value uses a value of said scanner correction quantity added to said manual correction quantity.

12. A photographic printer according to claim 11, wherein said algorithm forming means forms said algorithm every time one original image has been inspected.

13. A photographic printer according to claim 11, wherein said algorithm forming means forms said algorithm when a predetermined number of original images have been inspected.

14. A photographic printer including a scanner for measuring light at each point of an original image, obtaining a plurality of characteristic values based on the measured light values and calculating a scanner correction quantity based on the characteristic values, color filter means for adjusting three light color components for illuminating the original image in accordance with an exposure quantity determined by an average transmittance density of the original image and the scanner correction quantity and a simulator for displaying a simulated image of a finished photographic print in picking up said original image on illumination adjusted by said color filter means, said printer further comprising:

means for inputting as a target value, a manual correction quantity determined so as to obtain a proper finished photographic print while observing said simulated image;

means for calculating a target value by adding said scanner correction quantity to said manual correction quantity;

a memory for storing a plurality of target values and said characteristic values; and means for forming a new algorithm for obtaining a new scanner correction quantity by using said plurality of said target values and said characteristic values stored in said memory.

15. A photographic printer according to claim 14, wherein said scanner correction quantity Y is given by the following equation while representing said characteristic values, coefficients, and a constant by $X_1$ to $X_4$, $C_1$ to $C_4$, and $C_5$, respectively:

$$Y = C_1 X_1 + C_2 X_2 + C_3 X_3 + C_4 X_4 + C_5$$

wherein:

$X_1$ = average transmittance density of the upper half of said original image;

$X_2$ = average transmittance density of the lower half of said original image;

$X_3$ = average transmittance density of the central area of said original image;

$X_4$ = maximum transmittance density.

16. A photographic printer according to claim 15, wherein said algorithm forming means comprises means for performing regression analysis for obtaining the coefficients and the constant of said scanner correction quantity calculation equation.

17. A photographic printer according to claim 16, wherein said simulator comprises means for picking up said original image and outputting a video signal, means for processing said video signal so as to simulate the coloring characteristic of a photosensitive material on which said original image is printed and a CRT for displaying said simulated image by using said processed video signal.

18. A photographic printer according to claim 17, further comprising a zoom lens whose focal length is variable in accordance with the size of said original image, whereby said simulated image displayed on said CRT always has the same size, irrespective of the size of said original image.

19. A photographic printer according to claim 18, wherein said algorithm forming means obtains said coefficients and said constant every time one original image has been inspected.

20. A photographic printer according to claim 18, wherein said algorithm forming means obtains said coefficients and said constant when a predetermined number of original images have been inspected.

* * * * *